(12) United States Patent  
Chan et al.

(10) Patent No.: US 12,238,456 B2
(45) Date of Patent: Feb. 25, 2025

(54) VIRTUAL EXPO BOOTH PREVIEWS

(71) Applicant: Zoom Video Communications, Inc., San Jose, CA (US)

(72) Inventors: Andy Chan, Santa Clara, CA (US); Jeffrey Houng, Redmond, WA (US); Yuk Fai Lam, San Jose, CA (US); Pankaj Kumar Prasad, San Francisco, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/582,824

(22) Filed: Jan. 24, 2022

(65) Prior Publication Data
US 2023/0239434 A1 Jul. 27, 2023

(51) Int. Cl.
*H04N 7/15* (2006.01)
*H04L 65/1093* (2022.01)
*H04L 65/403* (2022.01)
*H04M 3/56* (2006.01)

(52) U.S. Cl.
CPC ......... *H04N 7/157* (2013.01); *H04L 65/1093* (2013.01); *H04L 65/403* (2013.01); *H04M 3/567* (2013.01); *H04N 7/152* (2013.01)

(58) Field of Classification Search
CPC .... H04N 7/157; H04N 7/152; H04L 65/1093; H04L 65/403; H04M 3/567
See application file for complete search history.

(56) References Cited

U.S. PATENT DOCUMENTS

| | | | |
|---|---|---|---|
| 9,853,922 B2 | 12/2017 | Brody et al. | |
| 10,952,006 B1 | 3/2021 | Krol et al. | |
| 2003/0156135 A1* | 8/2003 | Lucarelli | G06Q 30/02 715/757 |
| 2012/0019564 A1* | 1/2012 | Almgren | G06T 11/60 345/667 |
| 2012/0166969 A1 | 6/2012 | Gillo et al. | |
| 2018/0342106 A1 | 11/2018 | Rosado | |

(Continued)

FOREIGN PATENT DOCUMENTS

| | | |
|---|---|---|
| JP | 5368547 B2 | 12/2013 |
| WO | 2013003914 A1 | 1/2013 |
| WO | WO-2022232183 A1 * | 11/2022 |

OTHER PUBLICATIONS

EP International Search Report and Written Opinion for PCT/US2023/011029 mailed May 8, 2023.

(Continued)

*Primary Examiner* — Suraj M Joshi
(74) *Attorney, Agent, or Firm* — Kilpatrick Townsend & Stockton LLP

(57) ABSTRACT

One example method for virtual expo booth previews includes joining a virtual expo hosted by a video conference provider, the virtual expo including a plurality of virtual expo booths; presenting a graphical representation of the virtual expo and one or more virtual expo booths of the plurality of virtual expo booths; receiving an input indicating a first expo booth of the plurality of virtual expo booths; receiving, from the video conference provider, one or more multimedia streams associated with the first virtual expo booth; and presenting the one or more multimedia streams.

17 Claims, 11 Drawing Sheets

(56) References Cited

U.S. PATENT DOCUMENTS

2019/0005717 A1\* 1/2019 Singh ..................... G06T 15/80
2020/0412781 A1\* 12/2020 May ..................... A63F 13/822

OTHER PUBLICATIONS

Anonymous: "Welcome to Cyber Hitec Let's Take the Next Step Into the Future, Together, Virtual Exhibitor Guide", https://www.hftp.org/hitec/north_America/i/downloads/CYH20_Virtual_Exhibitor_Guide.pdf; Oct. 1, 2020; pp. 1-69.

\* cited by examiner

VIRTUAL EXPO BOOTH PREVIEWS

FIELD

The present application generally relates to video conferencing, and more specifically relates to virtual expo booth previews.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
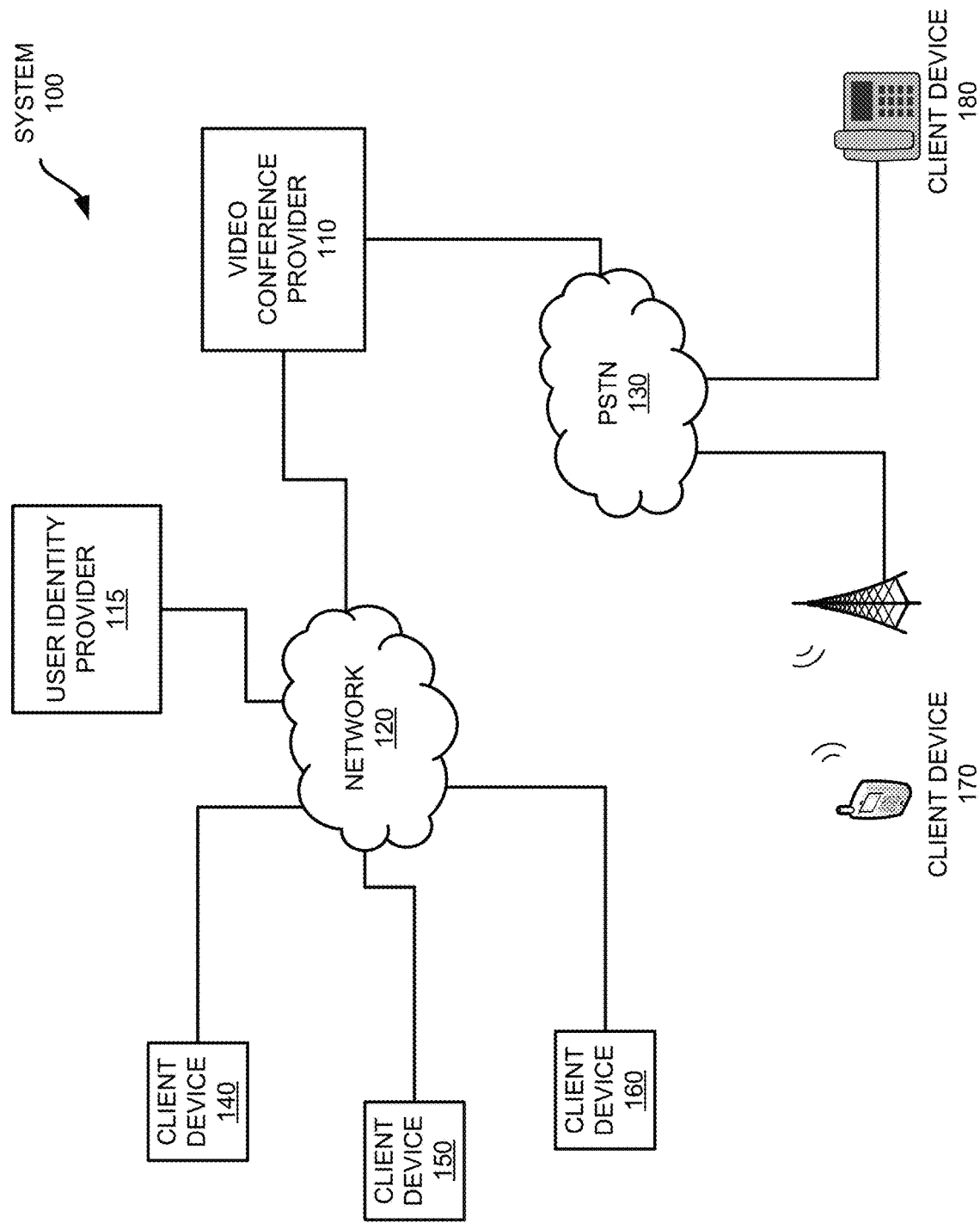
FIGS. 1-3 show example systems for virtual expo booth previews.

Examples are described herein in the context of virtual expo booth previews. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable user to host, join, and participate in video conference meetings with one or more other participants. In addition, a video conference provider can provide virtual conference experiences, such as a virtual exposition (or "expo") that provides a virtual expo space in which one or more virtual expo booths may be arrayed. The virtual expo booths may be hosted by sponsors of the virtual expo, by the host of the virtual expo, or by an attendee of the expo. Such virtual expos, or virtual expos, can enable participants to navigate the expo space to visit one or more of the expo booths, view content within the expo booths, or obtain information materials from the expo booths. Further, the expo booths themselves may provide one or more virtual presentations that participants can select between, as well as virtual "tables" where the participants can access and obtain information materials without entering into a specific presentation.

To enable participants to more easily identify expo booths or presentations of interest, a video conference provider may enable preview functionality for the expo booths or presentations. For example, as a participant navigates the virtual expo, they may encounter an expo booth that seems to be of interest. They may select the expo booth and be presented with the option to enter the expo booth or to preview the content of the expo booth. In some cases, where the expo booth has multiple presentation spaces, the user may enter the expo booth and then be able to select one of the presentation spaces to join or preview.

After selecting an option to preview the expo booth or presentation, the video conference provider may provide audio or video streams (collectively "multimedia streams") from the selected expo booth or presentation to the participant. However, in a preview mode, the presented multimedia streams may only last for a predetermined period of time, such as a few minutes, before requiring the participant to enter the expo booth or presentation to view more of the content. In some cases, the preview may include prerecorded content that is provided by the multimedia streams to the participant. Thus, the participant is able to obtain more information about the expo booth or presentation without joining the expo booth or presentation. However, if the content is of interest to the participant, they may select an option to join the expo booth or presentation. At which time, they will join the expo booth or presentation, which may allow the presenter(s) within the expo booth or presentation to interact with the participant and allow the participant to interact with the presenter(s) or other participants within the expo booth or presentation.

Such functionality can enable participants in a virtual expo to more easily navigate the virtual expo and identify content of interest without the need to transition from the virtual expo to a particular presentation. This may allow a more efficient experience for the participant as well as for the presenters or other participants within an expo booth or presentation. If participants are continually joining and leaving an expo booth or presentation as they assess whether it is of interest, it can disrupt the experience for other participants or the presenter(s). In addition, it can alleviate anxiety in some participants about joining a potentially interactive experience with unknown participants without first understanding whether the expo booth or presentation may be of interest.

For example, one example method includes joining a video conference hosted by a video conference provider, the video conference comprising a virtual expo including a plurality of virtual expo booths; presenting a graphical representation of the virtual expo and one or more virtual expo booths of the plurality of virtual expo booths; receiving an input indicating a first expo booth of the plurality of virtual expo booths; receiving, from the video conference provider, one or more multimedia streams associated with the first virtual expo booth; and presenting the one or more multimedia streams.

In addition, one example system includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to join a video conference hosted by a video conference provider, the video conference comprising a virtual expo including a plurality of virtual expo booths; present a graphical representation of the virtual expo and one or more virtual expo booths of the plurality of virtual expo booths; receive an input indicating a first expo booth of the plurality of virtual expo booths; receive, from the video conference provider, one or more multimedia streams associated with the first virtual expo booth; and present the one or more multimedia streams.

Further, one example non-transitory computer-readable medium includes processor-executable instructions configured to cause one or more processors to join a video conference hosted by a video conference provider, the video conference comprising a virtual expo including a plurality of virtual expo booths; present a graphical representation of the virtual expo and one or more virtual expo booths of the plurality of virtual expo booths; receive an input indicating a first expo booth of the plurality of virtual expo booths; receive, from the video conference provider, one or more multimedia streams associated with the first virtual expo booth; and present the one or more multimedia streams.

Another example method includes establishing a video conference comprising a virtual expo including a plurality of virtual expo booths, a plurality of participants connected to the virtual expo using respective client devices; providing information to enable display of the virtual expo to one or more client devices of the plurality of client devices; receiving a selection of a first virtual expo booth from a first client device; providing, to the first client device, information to enable display of the first virtual expo booth; and providing, to the first client device, one or more multimedia streams associated with a preview of content available within the first virtual expo booth.

Another example system includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to establish a video conference comprising a virtual expo including a plurality of virtual expo booths, a plurality of participants connected to the virtual expo using respective client devices; provide information to enable display of the virtual expo to one or more client devices of the plurality of client devices; receive a selection of a first virtual expo booth from a first client device; provide, to the first client device, information to enable display of the first virtual expo booth; and provide, to the first client device, one or more multimedia streams associated with a preview of content available within the first virtual expo booth.

In addition, another example non-transitory computer-readable medium includes processor-executable instructions configured to cause one or more processors to establish a video conference comprising a virtual expo including a plurality of virtual expo booths, a plurality of participants connected to the virtual expo using respective client devices; provide information to enable display of the virtual expo to one or more client devices of the plurality of client devices; receive a selection of a first virtual expo booth from a first client device; provide, to the first client device, information to enable display of the first virtual expo booth; and provide, to the first client device, one or more multimedia streams associated with a preview of content available within the first virtual expo booth.

This illustrative example is given to introduce the reader to the general subject matter discussed herein and the disclosure is not limited to this example. The following sections describe various additional non-limiting examples and examples of virtual expo booth previews.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
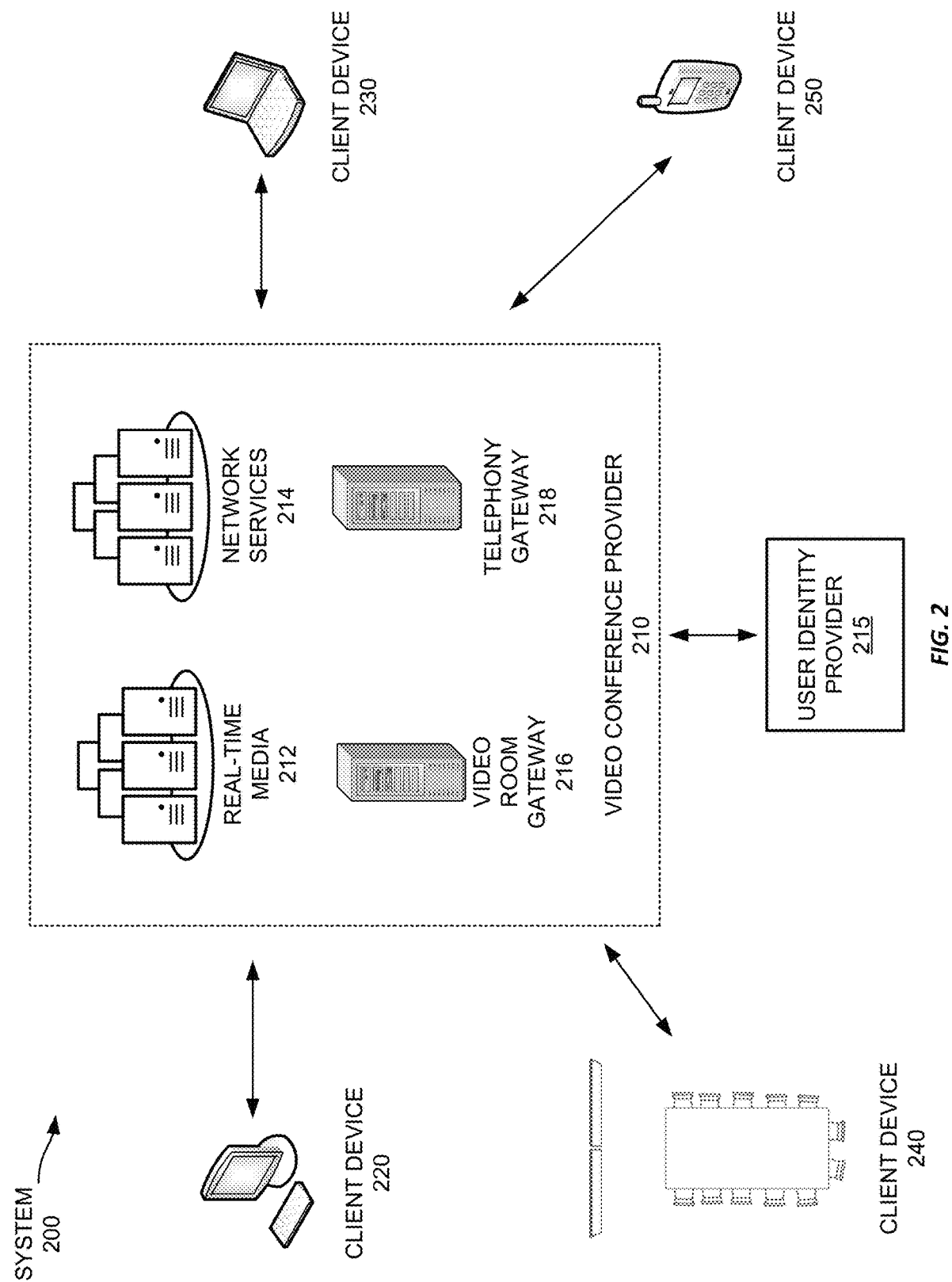

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
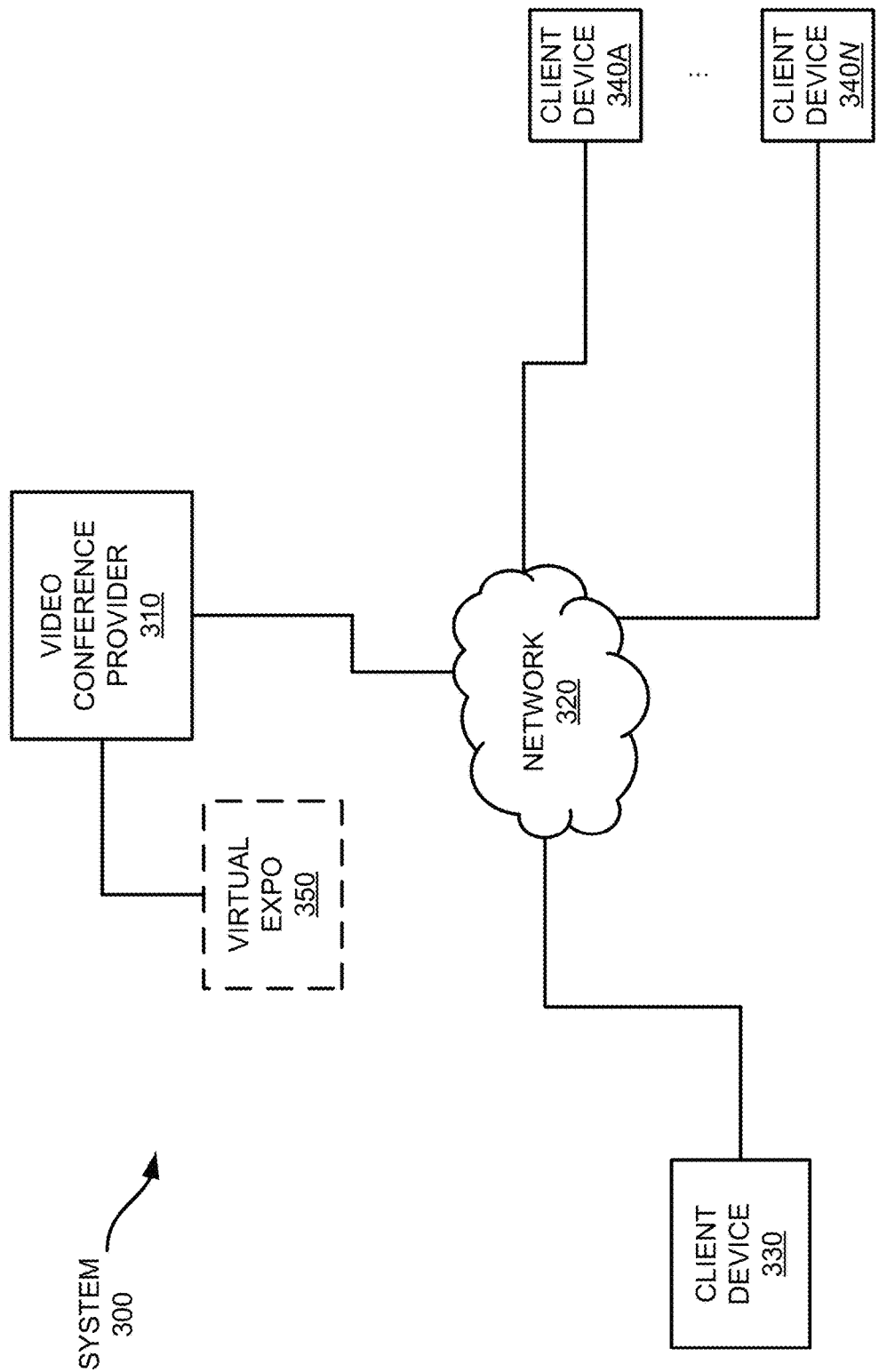

Referring now to FIG. 3, FIG. 3 shows an example system 300 for virtual expo booth previews. This example system 300 includes a client device 330 operated by a participant that is connected to one or more communications network 320, such as the internet. The system 300 also includes a video conference provider 310 and multiple other client device 340a-n that are also connected to the one or more communications network 320. In addition, the video conference provider 310 in this example is configured to provide one or more virtual expos 350.

In operation, a user may use a software client executed by client device 330 to join or host video conferences using the video conference provider 310, generally as described above with respect to FIGS. 1 and 2. During a video conference, the client device 330 sends and receives multimedia streams, such as audio or video streams, to the video conference provider 310, which in turn provides them to the other participants in the video conference.

In addition to conventional video conferences, the video conference provider 310 offers the ability to host virtual expos 350. A virtual expo or "expo" is a virtual event space within which hosts, sponsors, or other participants can establish expo "booths" for expo participants to browse and join. To participate in an expo, a participant can join the expo as they would for a video conference using a video conference software client application (or "software client"), at which time they are presented with an avatar that can be moved within the expo space. The avatar may be an icon, a static picture of the participant, or a view of the participant's own video feed.

As the participant moves within the expo space, they may see different expo booths with which they can interact. For example, they can select an expo booth to gain some information about it, such as the booth's sponsor, the dates or times when the expo booth is open, or whether the expo booth is open to anyone or invitations are required. If the user would like to join an expo booth, they can select an appropriate option within a GUI provided by the software client and participate in whatever features are available within the expo booth. However, if the participant is unsure whether they would like to join the expo booth, they may select an option to preview it instead. The preview option may allow the user an opportunity to view a portion of the content available within the expo booth for a short period of time, but without actually joining the expo booth. Because joining an expo booth may allow the sponsor of the expo booth or other participants within the expo booth to interact with the participant, they may wish to preview the expo booth before joining. To illustrate this process, FIGS. 4-8 show example GUIs for virtual expo booth previews.

Figure 4:
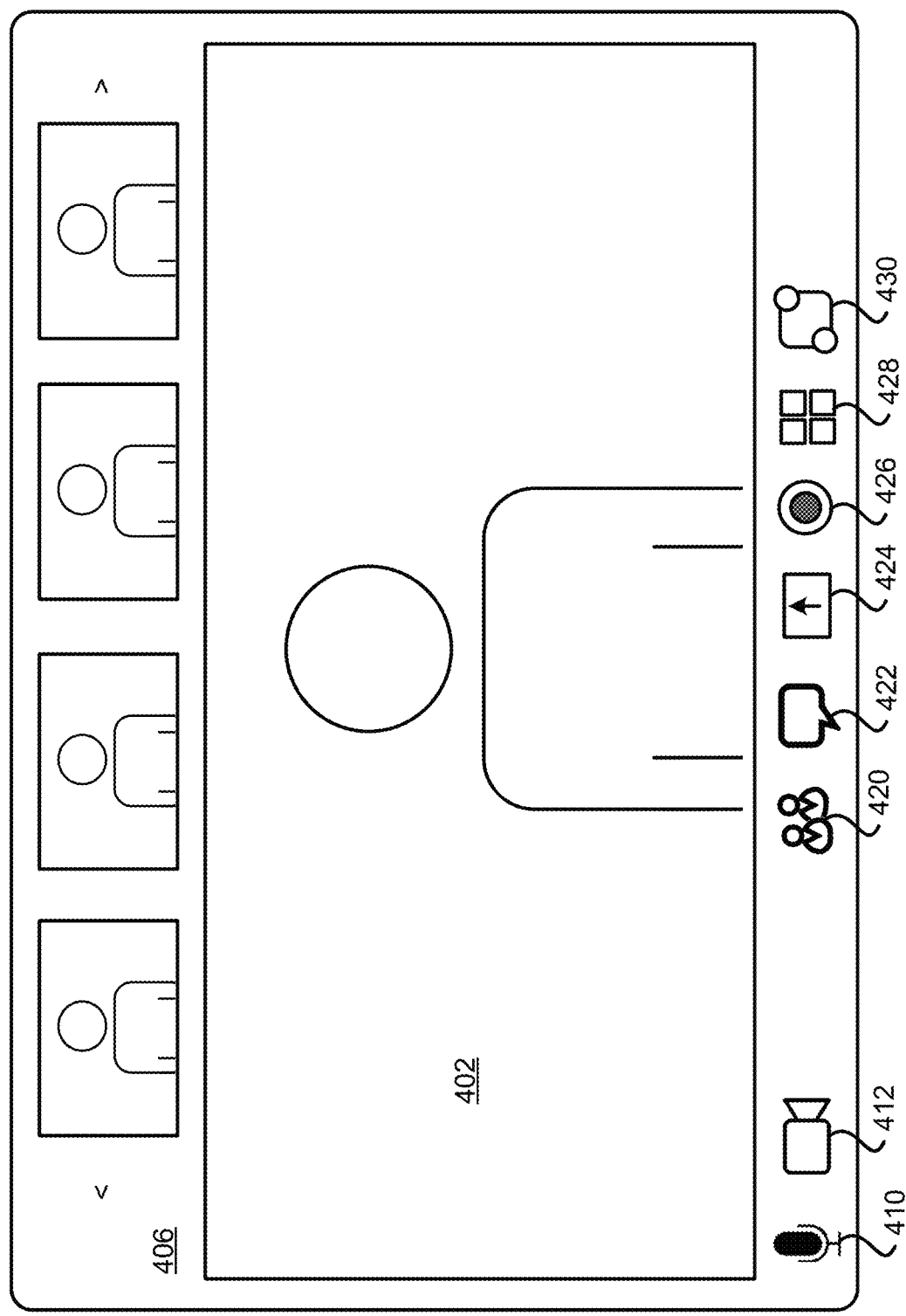
FIGS. 4-6, 7A, and 7B show example graphical user interfaces (each a "GUI") suitable for use with systems and methods for virtual expo booth previews.

The GUI 400 shown in FIG. 4 shows an example default GUI 400 presented to participants in a video conference. A client device, e.g., client device 330 or client devices 340a-n, executes a video conferencing application, which in turn displays the GUI 400 on the client device's display. In this example, the GUI 400 includes a speaker view window 402 that presents the current speaker 434 in the video conference. Above the speaker view window 402 are smaller participant windows 404, which allow the user to view some of the other participants in the video conference, as well as controls ("<" and ">") to let the host scroll to view other participants in the video conference.

Beneath the speaker view window 402 are a number of interactive elements 410-430 to allow the participant to interact with the video conferencing application. Controls 410-412 may allow the participant to toggle on or off audio or video streams captured by a microphone or camera connected to the client device. Control 420 allows the participant to view any other participants in the video conference with the participant, while control 422 allows the participant to send text messages to other participants, whether to specific participants or to the entire meeting. Control 424 allows the participant to share content from their client device. Control 426 allows the participant toggle recording of the meeting, and control 428 allows the user to select an option to join a breakout room.

During the normal course of a video conference, the user interacts with the video conferencing application and other participants via the GUI 400. If the user elects to join a virtual expo, however, they may be presented with a different GUI arrangement. For example, the participant may attend a virtual industry conference hosted by a video conference provider 310 that includes a number of presentation sessions throughout the day, but with interspersed breaks to allow the participants to join an expo hosted in conjunction with the industry conference. To access the expo, the participant may select a GUI element, such as element 430. Alternatively, the participant may be automatically joined to the expo after a presentation session concludes, or otherwise presented with an option to join the expo.

Figure 5:
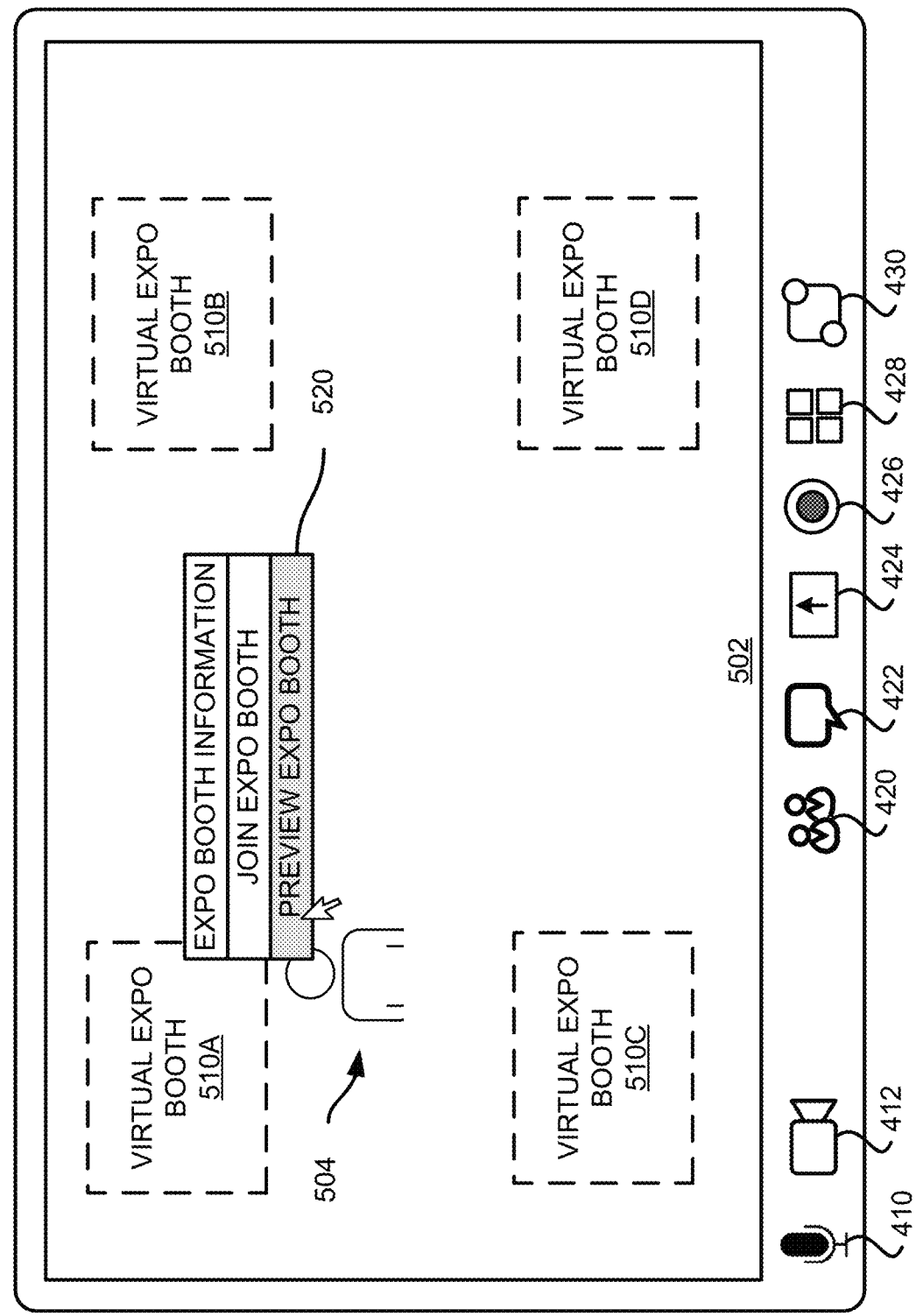

Referring now to FIG. 5, FIG. 5 shows an example GUI 500 for virtual expo booth previews. In this example, the speaker view window 402 and the participant windows 404 have been replaced by a view of a portion of the virtual expo 502. In this example, the view of the expo 502 is a top-down two-dimensional view of a virtual expo space that has multiple different virtual expo booths 510a-d positioned within it And while this example shows four virtual expo booths 510a-d, any number of virtual expo booths may be included. Further, it should be appreciated that the view of the expo 502 in this example only shows a portion of the virtual expo space. The participant may be able to zoom in or out to view a broader or more focused view of the expo space as desired. And while this example GUI 500 presents the expo as a two-dimensional space, it should be appreciated that the expo space may be presented in a three-dimensional view or using virtual or augmented reality instead.

In addition to the virtual expo booths 510*a-d*, an avatar 504 for the participant is also displayed. The avatar 504 may be moved by the participant within the expo 502 to view different available virtual expo booths or to interact with other participants within the expo 502.

As can be seen in this example, the participant has moved their avatar 504 near one of the virtual expo booths 510*a* and has used their mouse to open a menu 520 of options available for the virtual expo booth 510*a*. The menu 520 includes options to obtain information about the expo booth, to join the expo booth, or to preview the expo booth, which is the participant's selection as illustrated by the highlighting on the option.

Figure 6:
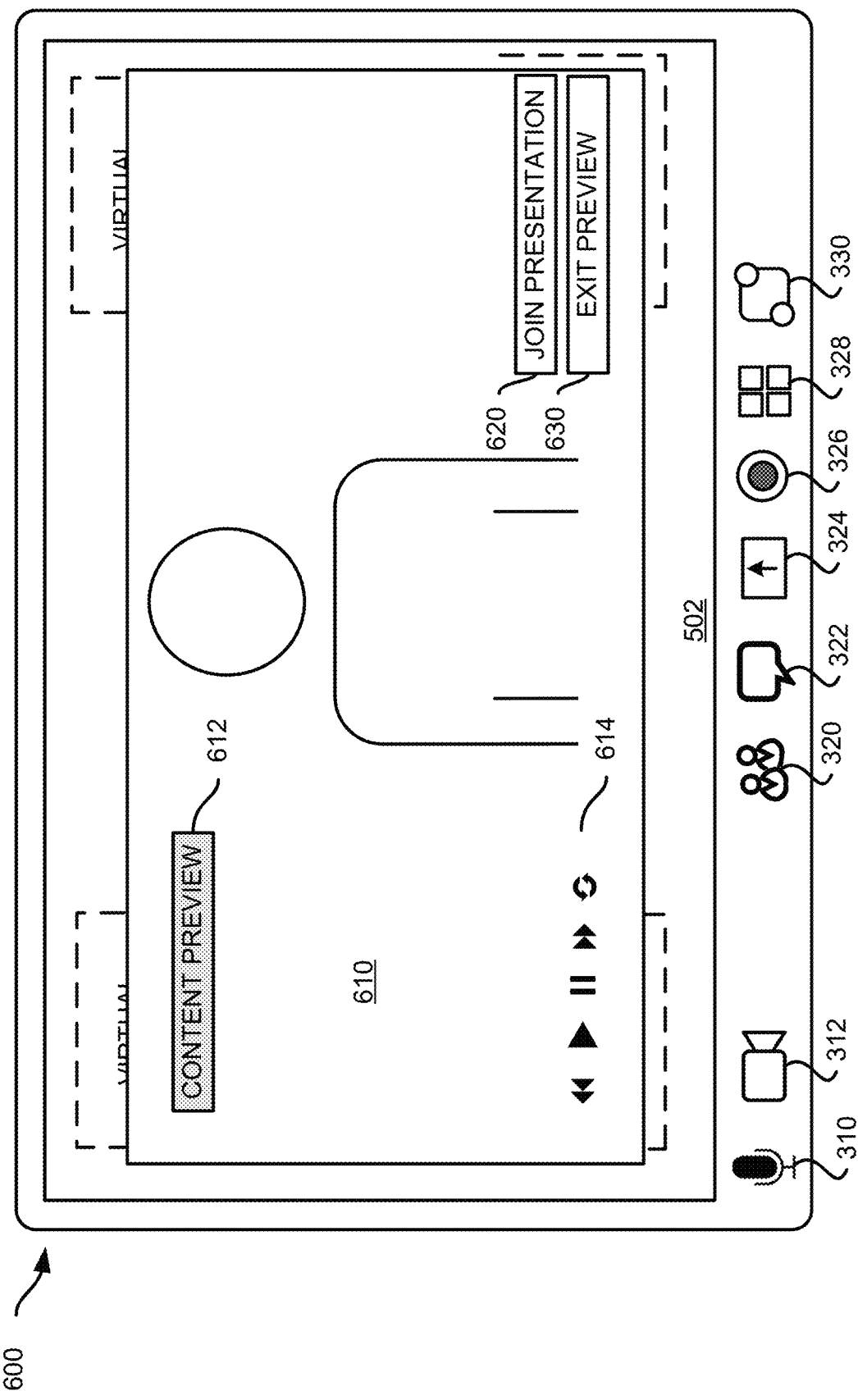

Referring now to FIG. 6, FIG. 6 shows an example of a GUI 600 that is providing a preview of content available within the selected virtual expo booth 510*a*. In this example, the GUI 600 displays a content preview window 610 overlaid on the view of the virtual expo 502. The content preview 610 is a view of a presentation occurring within the virtual expo booth, which in this example is a recording of a short segment of the beginning of the presentation to provide potentially interested participants with an overview of the presentation within the expo booth. Thus, the preview in this example may be viewed by the participant, but the participant may not interact with the presenter or with any other participants within the virtual expo booth 510*a*. And while this example uses a pre-recorded preview, other examples may allow the participant to view the current live expo booth video conference, though the participant may not have the ability to interact with the expo booth and the participants or presenter(s) may not have the ability to interact with the participant.

The content preview 610 includes an indicator 612 that the participant is only viewing a preview of the content within the virtual expo booth 510*a*. In addition, the content preview 610 includes options 620, 630 to join the presentation or to exit the preview as well as playback controls 614 for the content preview, including buttons to allow the user to play, pause, rewind, restart, or fast forward the content preview. In some examples, the participant may be automatically joined to the expo booth 510 after the content preview 610 concludes or within a predetermined period of time after the content preview 610 concluding. In some examples, the participant may be returned to the virtual expo 502 after the content preview 610 concludes or within a predetermined period of time after the content preview 610 concluding. Further, the content preview may repeat once it completes.

Figure 7A:
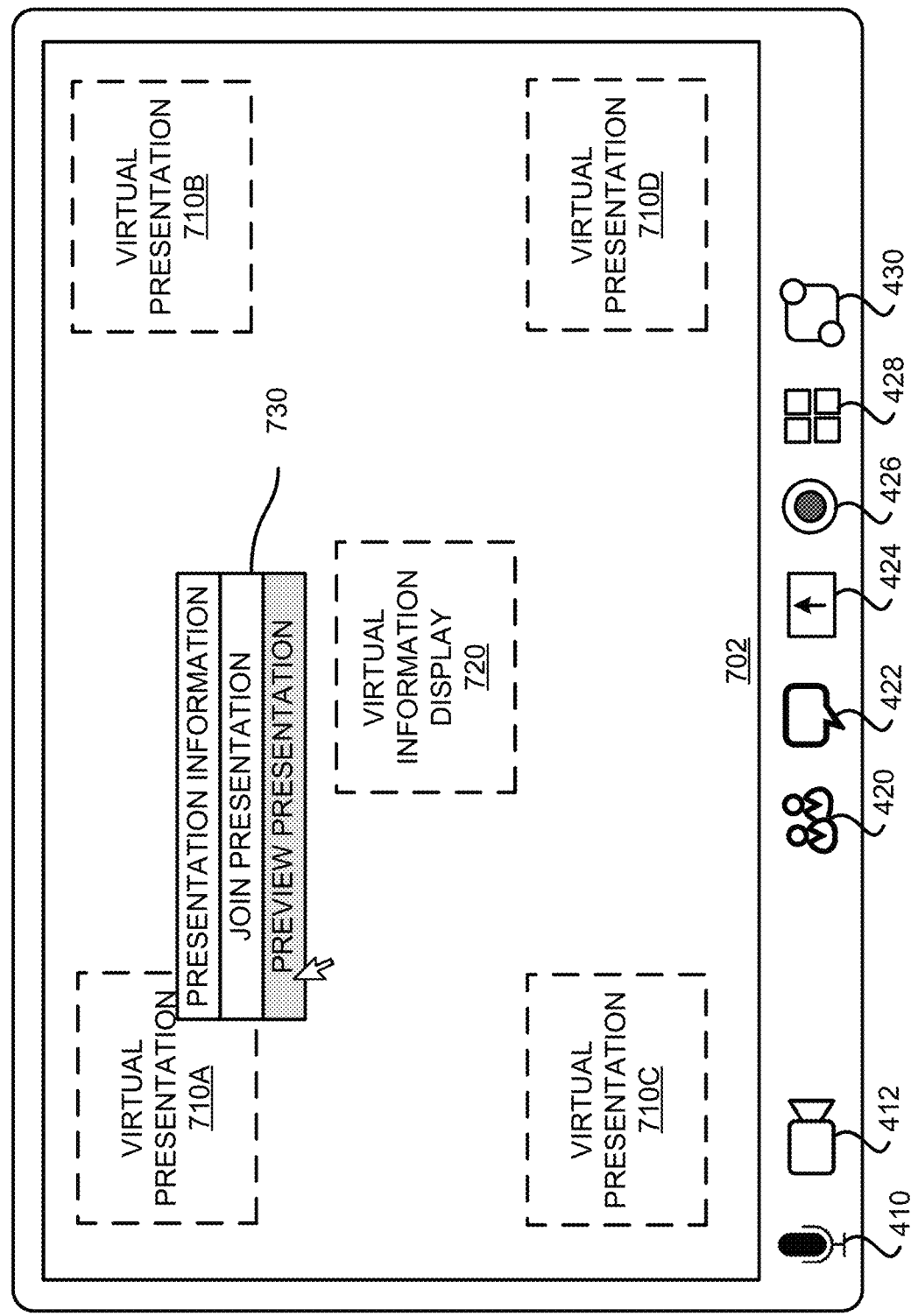
Figure 7B:
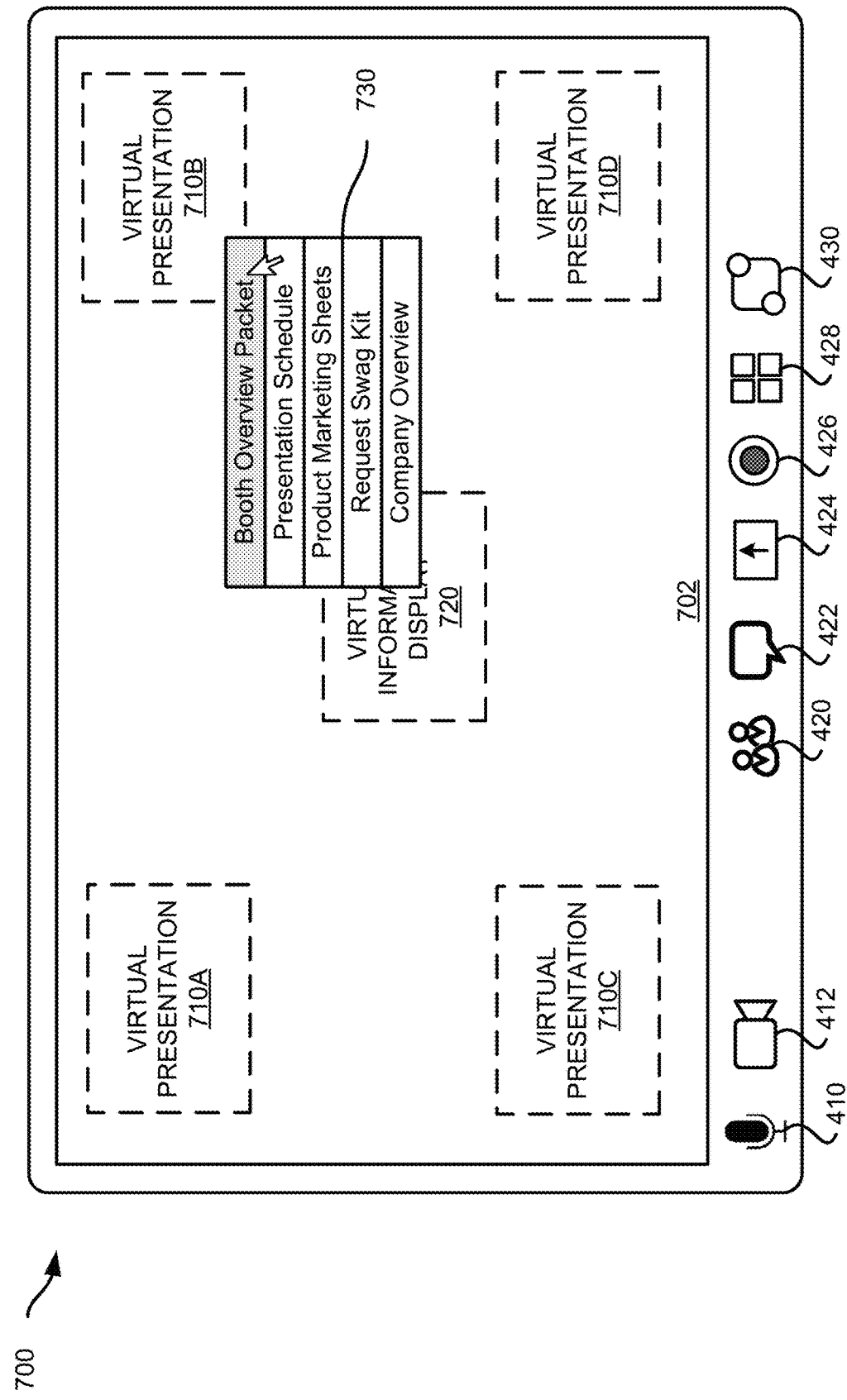

Referring now to FIGS. 7A-7B, FIG. 7A shows an example GUI 700 for virtual expo booth previews. In this example, the participant has selected a virtual expo booth 510*b* that has multiple presentations 710*a-d* within it as well as a virtual information display 720. And while this example includes four virtual presentations 710*a-d*, a virtual expo booth may include any number of virtual presentations.

Once the participant has entered a virtual expo booth that includes multiple virtual presentations, they may elect to preview content within one or more of them, or, if a virtual information display 720 is available, they may elect to interact with the virtual information display 720. In this example, the participant has selected one of the virtual presentations 710*a*, which presented a menu 720 of options for the participant to obtain overview information about the presentation, to join the presentation, or to preview the presentation, which was the participant's selection. Upon making the selection, the content preview 610 interface shown in FIG. 6 may be presented to the user overlaid on the GUI 702 to allow the participant to preview the virtual presentation 710*a*. As with the example discussed with respect to FIG. 6, the participant will be notified that they are viewing a content preview. In addition, they can select options to use playback controls 614, to join the presentation 620, or to exit the preview 630.

Referring to FIG. 7B, the participant has decided to interact with the virtual information display 720 and is presented with a menu 730 that provides the options to obtain an overview packet for the virtual expo booth 510*b*, a copy of the presentation schedule, marketing sheets for different products, an option to request a swag kit from the booth sponsor, and overview materials for the company sponsoring the virtual expo booth 510*b*. If the user selects one or more of the options, they video conference provider 310 may directly download a copy of the selected materials to the participant's client device 330, display a copy of the selected materials within the GUI, or it may provide a link, such as a uniform resource locator ("URL"), at which the select material(s) may be obtained, such as by downloading or viewing online. In the case of the swag kit, the sponsor may request information from the participant regarding where to send the swag kit, if it includes physical items.

Figure 8:
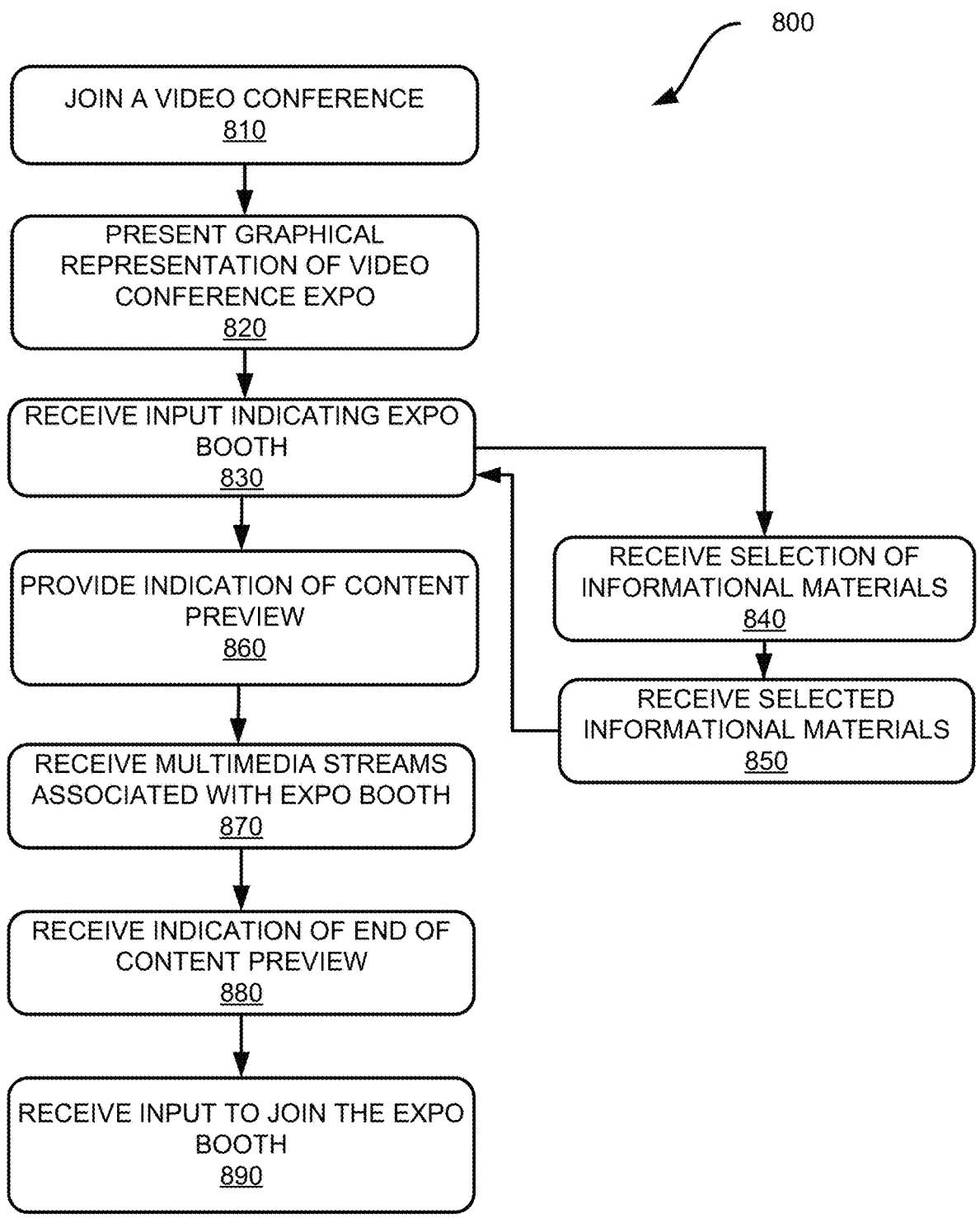
FIGS. 8-9 show example methods for virtual expo booth previews.

Referring now to FIG. 8, FIG. 8 shows an example method for virtual expo booth previews. The example method 800 will be described with respect to the example system shown in FIG. 3 and with respect to the GUIs shown in FIGS. 4-7B; however, any suitable systems or GUIs may be employed.

At block 810, a participant uses their client device 330 to join a video conference hosted by a video conference provider 310, generally as described above with respect to FIGS. 1-3. However, in this example, the participant joins a virtual expo 350 hosted by the video conference provider 310.

At block 820, the client device 330 presents a graphical representation of the virtual expo 502. In this example, the virtual expo 350 includes multiple different virtual expo booths 510*a-n*, several of which 510*a-d* are illustrated in FIG. 5. Further, each of the virtual expo booths 510*a-n* includes one or more presentations 710*a-d* or virtual information displays 720.

At block 830, the client device 330 receives an input indicating a virtual expo booth 510*a* that the participant would like to interact with. In this example, the participant touched a touchscreen on their client device to select the virtual expo booth 510*a*, though any suitable input, e.g., from a mouse or keyboard, may be used. Further in some examples, the participant may not need to explicitly select the expo booth. For example, the participant may move their avatar into proximity of an expo booth, which may be interpreted as a selection of the expo booth.

If the virtual expo booth 510*a* includes multiple different presentations 710*a-d* or a virtual information display 720, the participant may enter the expo booth 510*a* and may then select one of the presentations or the virtual information display 720 to interact with, such as is illustrated in FIGS. 7A-7B. However, if the expo booth 510*a* only has a single presentation, the input indicating the expo booth 510*a* may also be interpreted as an indication to select the virtual presentation.

After receiving the input, the client device 330 may present the participant with one or more options regarding how to interact with the selected object. If the participant selected a virtual presentation 710*a-d*, the menu 730 provides different options, including options to enter the presentation or to preview the presentation. If the participant then selects the option to preview the presentation, the method proceeds to block 860. If the participant elects to interact with a virtual information display 720, they may select an option to receive one or more information materials available from the information display 720. In which case, the method proceeds to block 840.

At block 840, the participant selects the information display 720 and either selects an option to receive one or more information materials from the display 720 or they may automatically issue a request for the informational materials by interacting with the information display. The client device 330 then transmits a request to the video conference provider 310 for the corresponding informational materials.

In some examples, after the participant selects the information display 720, the client device 330 may present the participant with a graphical representation of one or more of the available materials instead of (or in addition to) one or more menu options. The participant may then interact with the menu or one or more of the graphical representations to select one or more informational materials, and the client device 330 receives the request, which causes it to send a request to the video conference provider 310 for the selected informational material(s).

At block 850, the client device 330 receives the selected informational materials. In some examples, the client device 330 may receive the informational materials from the video conference provider 310 in response to the request. However, in some examples, the client device 330 may receive a reference to the informational materials, such as a URL, which causes the client device 330 to request and receive the informational materials using the reference. At which time, the method returns to bock 830 and awaits a further interaction from the participant.

At block 860, the client device 330 provides an indication to the video conference provider 310 of a request for a content preview associated with the expo booth 510*a* or presentation.

At block 870, the client device 330 receives one or more multimedia streams associated with the expo booth 510*a* or presentation. In this example, the client device 300 received a video stream and an audio stream from the video conference provider 310, which provide a preview of content within the expo booth 510*a* or presentation. In this example, the multimedia streams provide a time-limited representation of live content presented within the first virtual expo booth 510*a*, such as a two- or three-minute preview of the live content, during which the participant may or may not be allowed to interact with the expo booth, and participants or presenters within the expo booth may not be aware of the participant that is previewing the content. For example, the multimedia streams may include an audio and video stream from a presenter within the virtual expo booth 510*a* or presentation. The multimedia streams may include an additional video stream having content presented by the presenter. Still other multimedia streams may be received, such as audio or video streams from one or more other participants within the expo booth 510*a* or virtual presentation.

In some examples, the multimedia streams may provide a recorded segment of content previously presented within the first virtual expo booth 510*a*. For example, the participant may be presented with audio and video streams from an introductory portion of the presentation that occurred in the past, or the video conference provider may maintain a five-minute recording up to the present time, such as in a circular buffer to allow participants to view what topics may be currently being covered within the expo booth 510*a* or presentation. Alternatively, the recording may be of content presented on a previous day or in an earlier-scheduled presentation. Thus, the pre-recorded content may not be from the session the participant may be able to join, but instead may be from a prior session of the same presentation content, whether in the current virtual expo in a past virtual expo. Further, in some examples, the expo booth sponsor may provide a custom pre-recorded overview of the expo booth, rather than recording prior sessions to use as a preview. Thus, the sponsor or host of the expo booth 510*a* or virtual presentation may be able to create a preview at the beginning of the virtual expo and re-use that recording throughout the virtual expo, or in subsequent virtual expos.

At block 880, the client device 330 receives an indication of the end of the content preview. In this example, the client device 330 receives an end-of-stream indication, indicating that content presented in the identified stream has ended, which may cause the client device 330 to unsubscribe from the stream. In some examples, the video conference provider 310 may close a stream after the content preview has ended. In some examples where the participant previews a time-limited live presentation, the video conference provider 310 may stop forwarding video and audio from the expo or presentation and may, instead, transmit an indication that the preview period has ended. The client device 330 may thus receive the indication as the termination of the multimedia stream.

At block 890, the client device 330 receives an input to join the expo booth 510*a* or presentation 710*a*. In this example, the participant interacts with a menu 520, 730 and selects an option to join the expo booth 510*a* or the presentation. However, in some examples, the participant may select a button 620 available within the content preview, such as is illustrated in FIG. 6. In response, the client device 330 sends a request to the video conference provider 310 to join the selected expo booth 510*a* or presentation.

While the method 800 described above has been described according to a particular order, such ordering is not required. Further, not all blocks depicted in FIG. 8 are required. For example, blocks 840-850 and 880 may be omitted in some examples. Further block 860 may be omitted in some examples as well. For example, rather than the client device 330 providing an indication of a content preview to the video conference provider 310, the video conference provider 310 may provide the client device 330 with information associated with one or more multimedia streams providing preview content when a participant navigates their avatar into proximity with a virtual expo booth or a virtual presentation. Thus, when the participant selects the option to preview content within the expo booth or virtual presentation, the client device 330 may access the associated multimedia stream(s) without providing an indication to the video conference provider 310.

Figure 9:
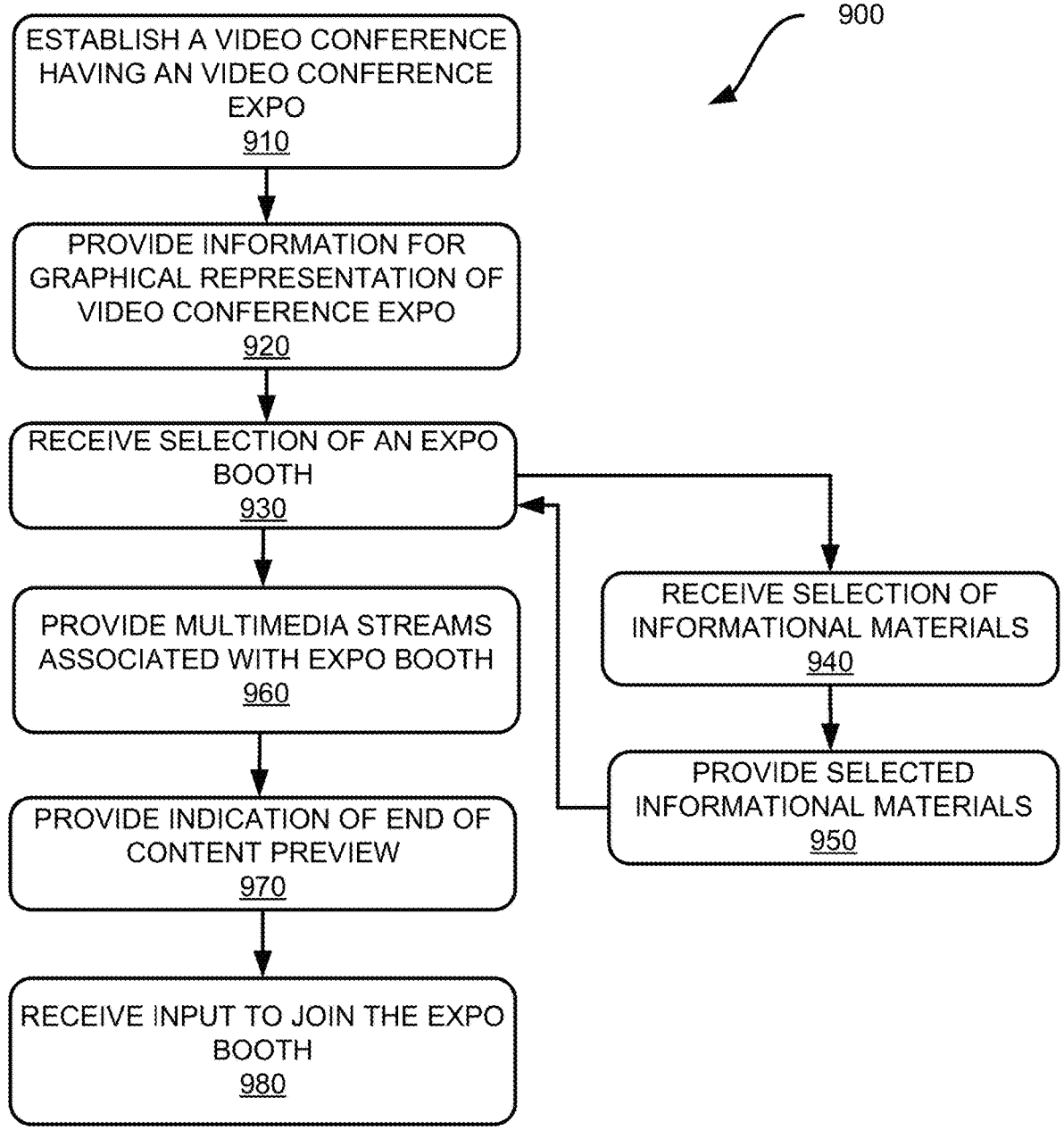

Referring now to FIG. 9, FIG. 9 an example method for virtual expo booth previews. The example method 800 will be described with respect to the example system shown in FIG. 3 and with respect to the GUIs shown in FIGS. 4-7B; however, any suitable systems or GUIs may be employed At block 910, the video conference provider 310 establishes a video conference having a virtual expo 350 that includes multiple virtual expo booths 510*a-d*. In this example, the virtual expo 350 provides a video conference to which one or more participants may join and view a virtual conference expo floor including the virtual expo booths 510*a-d*.

At block 920, the video conference provider 310 provides information to enable display of the virtual expo 350 to each participant in the virtual expo. In this example, the video conference provider 310 provides information defining the size and shape of the virtual expo 350 as well as locations of the virtual expo booths 510*a-d*. In some examples, the video conference provider 310 may provide information associated with one or more other participants within the virtual expo 350. Information associated with other participants may include locations of the respective participants within the virtual expo 350, avatar information, or names or other personal information.

At block 930, the video conference provider 310 receives a selection of a virtual expo booth 510*a-d* from a first client device 330. As discussed above, a user may select a virtual expo booth 510*a-d*, such as by interacting with a menu 520 displayed on their display. In some examples, the video conference provider 310 may receive a selection of a virtual expo booth 510*a-d* based on a participant moving a corresponding avatar into proximity of virtual expo booth.

After the participant has selected a virtual expo booth 510*a-d*, they may enter the expo booth 510*a-d*, such as if multiple presentations 710*a-d* are available or if a virtual information display 720 is provided. If the participant enters the expo booth 510*a-d* and selects a virtual information booth 720, the method 900 proceeds to block 940. Otherwise, the participant may select an option to preview content within the expo booth 510*a-d*.

At block 940, the video conference provider 310 receives a selection of information material, such as discussed above with respect to block 840.

At block 950, the video conference provider 310 provides the selected information material. As described above with respect to block 850, the video conference provider 310 may download a copy of the selected materials to the participant's client device. However, in some examples, it may provide a link to the selected materials at another location, or it may provide a representation of the selected materials to the client device 330, such as by providing a graphical, audio, or multimedia representation of the selected materials. After which, the method 900 may return to block 930.

At block 960, the video conference provider 310 provides one or more multimedia streams to the participant's client device 330 to provide a content preview of the expo booth 510*a-d* or an associated presentation 710*a-d*. As discussed above with respect to block 860-870, the client device 330 may provide a request for the multimedia streams, or the video conference provider 310 may provide the multimedia streams without a request, such as in response to determining that the participant's avatar is within proximity of the expo booth 510*a-d*. And while the video conference provider 310 may provide the multimedia streams to the client device 330, such as by publishing the multimedia streams to allow the client device to subscribe and receive the content, the client device 330 may not subscribe to the streams to receive them until the participant selects an option to preview the content.

At block 970, the video conference provider 310 provides an indication of the end of a content preview, generally as discussed above with respect to block 880.

At block 980, the video conference provider 310 receives an input indicating the participant has selected an option to join the expo booth 510*a-d* or the associated presentation 710*a-d*, generally as described above with respect to block 890.

While the method 900 described above has been described according to a particular order, such ordering is not required. Further, not all blocks depicted in FIG. 9 are required. For example, blocks 940-950 and 970 may be omitted in some examples.

Figure 10:
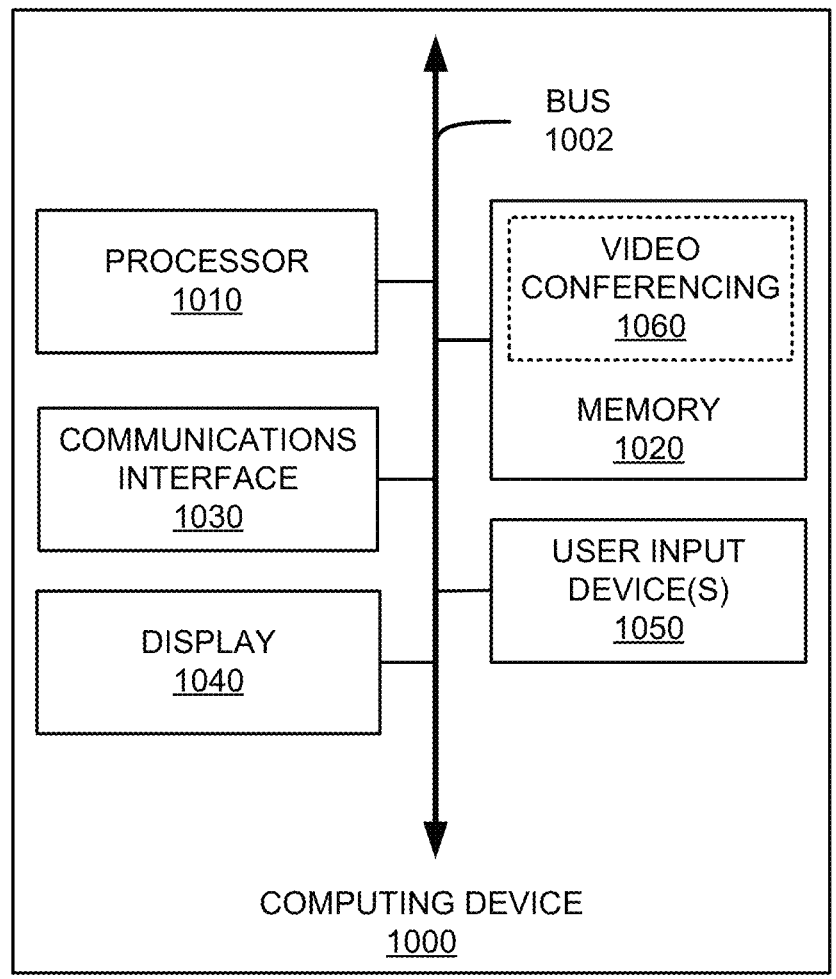
FIG. 10 shows an example computing device suitable for use with systems and methods for virtual expo booth previews.

Referring now to FIG. 10, FIG. 10 shows an example computing device 1000 suitable for use in example systems or methods for virtual expo booth previews according to this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for virtual expo booth previews according to different examples, such as part or all of the example methods 800, 900 described above with respect to FIGS. 8 and 9. The computing device 1000, in this example, also includes one or more user input devices 1050, such as a keyboard, mouse, touchscreen, microphone, etc., to accept user input. The computing device 1000 also includes a display 1040 to provide visual output to a user.

In addition, the computing device 1000 includes a video conferencing application 1060 to enable a user to join and participate in a video conference, such as a conventional meeting or webinar, by receiving multimedia streams from a video conference provider, sending multimedia streams to the video conference provider, joining and leaving breakout rooms, provide virtual expo booth previews, etc., such as described throughout this disclosure, etc.

The computing device 1000 also includes a communications interface 1040. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

Multiple examples have been discussed; however, any number of examples may be employed according to this disclosure. For example, a first example includes a method that includes joining a video conference hosted by a video conference provider, the video conference comprising a virtual expo including a plurality of virtual expo booths; presenting a graphical representation of the virtual expo and one or more virtual expo booths of the plurality of virtual expo booths; receiving an input indicating a first expo booth of the plurality of virtual expo booths; receiving, from the video conference provider, one or more multimedia streams associated with the first virtual expo booth; and presenting the one or more multimedia streams.

A second example employs the method of the first example, wherein the input indicates a selection to preview content presented within the first virtual expo booth.

A third example employs the method of the first or second example, wherein the one or more multimedia streams provide a time-limited representation of live content presented within the first virtual expo booth.

A fourth example employs the method of any of the first to third examples, wherein the one or more multimedia streams provide a recorded segment of content previously presented within the first virtual expo booth.

A fifth example employs the method of any of the first to fourth examples, wherein the input indicates a selection to preview content presented within the first virtual expo booth, and wherein the one or more multimedia streams provide preview of content presented within the first virtual expo booth, and wherein the method further includes providing an indication that the preview of the content has concluded; and providing an indication requesting whether to enter the first virtual expo booth.

A sixth example employs the method of any of the first to fifth examples, wherein the input indicates a selection to preview content presented within the first virtual expo booth, and wherein the method further includes receiving an input to join the first virtual expo booth.

A seventh example employs the method of any of the first to sixth examples, wherein the method further includes presenting a graphical representation of a plurality of virtual presentations available within the first virtual expo booth; receiving a selection of a first virtual presentation; and wherein the one or more multimedia streams are further associated with the first virtual presentation.

An eighth example employs the method of any of the first to seventh examples, wherein the method further includes, after receipt of the input indicating the first virtual expo booth, presenting a graphical representation of a plurality of virtual presentations available within the first virtual expo booth; presenting a graphical representation of a virtual informational display; receiving a selection of the virtual informational display; presenting one or more informational resources; receiving a selection of a first information resource of the one or more informational resources; and obtaining a copy of the first information resources.

A ninth example is a system that includes a communications interface; a non-transitory computer-readable medium; and one or more processors communicatively coupled to the communications interface and the non-transitory computer-readable medium, the one or more processors configured to execute processor-executable instructions stored in the non-transitory computer-readable medium to join a video conference hosted by a video conference provider, the video conference comprising a virtual expo including a plurality of virtual expo booths; present a graphical representation of the virtual expo and one or more virtual expo booths of the plurality of virtual expo booths; receive an input indicating a first expo booth of the plurality of virtual expo booths; receive, from the video conference provider, one or more multimedia streams associated with the first virtual expo booth; and present the one or more multimedia streams.

A tenth example employs the system of the ninth example, wherein the input indicates a selection to preview content presented within the first virtual expo booth.

An eleventh example employs the system of the ninth or tenth examples, wherein the one or more multimedia streams provide a time-limited representation of live content presented within the first virtual expo booth.

A twelfth example employs the system of any of the ninth through eleventh examples, wherein the one or more multimedia streams provide a recorded segment of content previously presented within the first virtual expo booth.

A thirteenth example employs the system of any of the ninth through twelfth examples, wherein the input indicates a selection to preview content presented within the first virtual expo booth, and wherein the one or more multimedia streams provide preview of content presented within the first virtual expo booth, and wherein the one or more processors are configured to execute further processor-executable instructions stored in the non-transitory computer-readable medium to provide an indication that the preview of the content has concluded; and provide an indication requesting whether to enter the first virtual expo booth.

A fourteenth example employs the system of any of the ninth through thirteenth examples, wherein the input indicates a selection to preview content presented within the first virtual expo booth, and wherein the one or more processors are configured to execute further processor-executable instructions stored in the non-transitory computer-readable medium to receive an input to join the first virtual expo booth.

A fifteenth example employs the system of any of the ninth through fourteenth examples, wherein the one or more processors are configured to execute further processor-executable instructions stored in the non-transitory computer-readable medium to present a graphical representation of a plurality of virtual presentations available within the first virtual expo booth; receive a selection of a first virtual presentation; and wherein the one or more multimedia streams are further associated with the first virtual presentation.

A sixteenth example employs the system of any of the ninth through fifteenth examples, wherein the one or more processors are configured to execute further processor-executable instructions stored in the non-transitory computer-readable medium to, after receipt of the input indicating the first virtual expo booth, present a graphical representation of a plurality of virtual presentations available within the first virtual expo booth; present a graphical representation of a virtual informational display; receive a selection of the virtual informational display; present one or more informational resources; receive a selection of a first information resource of the one or more informational resources; and obtain a copy of the first information resources.

A seventeenth example is a non-transitory computer-readable medium that includes processor-executable instructions configured to cause one or more processors to join a video conference hosted by a video conference provider, the video conference comprising a virtual expo including a plurality of virtual expo booths; present a graphical representation of the virtual expo and one or more virtual expo booths of the plurality of virtual expo booths; receive an input indicating a first expo booth of the plurality of virtual expo booths; receive, from the video conference provider, one or more multimedia streams associated with the first virtual expo booth; and present the one or more multimedia streams.

An eighteenth example employs the non-transitory computer-readable medium of the seventeenth example, wherein the input indicates a selection to preview content presented within the first virtual expo booth.

A nineteenth example employs the non-transitory computer-readable medium of the seventeenth or eighteenth examples, wherein the one or more multimedia streams provide a time-limited representation of live content presented within the first virtual expo booth.

A twentieth example employs the non-transitory computer-readable medium of any of the seventeenth through nineteenth examples, wherein the one or more multimedia streams provide a recorded segment of content previously presented within the first virtual expo booth.

A twenty-first example employs the non-transitory computer-readable medium of any of the seventeenth through twentieth examples, wherein the input indicates a selection to preview content presented within the first virtual expo booth, and wherein the one or more multimedia streams provide preview of content presented within the first virtual expo booth, and wherein the non-transitory computer-readable medium includes further processor-executable instructions configured to cause the one or more processors to provide an indication that the preview of the content has concluded; and provide an indication requesting whether to enter the first virtual expo booth.

A twenty-second example employs the non-transitory computer-readable medium of any of the seventeenth through twenty-first examples, wherein the input indicates a selection to preview content presented within the first virtual expo booth, and wherein the non-transitory computer-readable medium includes further processor-executable instructions configured to cause the one or more processors to receive an input to join the first virtual expo booth.

A twenty-third example employs the non-transitory computer-readable medium of any of the seventeenth through twenty-second examples, wherein the non-transitory computer-readable medium includes further processor-executable instructions configured to cause the one or more processors to present a graphical representation of a plurality of virtual presentations available within the first virtual expo booth; receive a selection of a first virtual presentation; and wherein the one or more multimedia streams are further associated with the first virtual presentation.

A twenty-fourth example employs the non-transitory computer-readable medium of any of the seventeenth through twenty-third examples, wherein the non-transitory computer-readable medium includes further processor-executable instructions configured to cause the one or more processors to, after receipt of the input indicating the first virtual expo booth, present a graphical representation of a plurality of virtual presentations available within the first virtual expo booth; present a graphical representation of a virtual informational display; receive a selection of the virtual informational display; present one or more informational resources; receive a selection of a first information resource of the one or more informational resources; and obtain a copy of the first information resources.

A twenty-fifth example includes a method that includes establishing a video conference comprising a virtual expo including a plurality of virtual expo booths, a plurality of participants connected to the virtual expo using respective client devices; providing information to enable display of the virtual expo to one or more client devices of the plurality of client devices; receiving a selection of a first virtual expo booth from a first client device; providing, to the first client device, information to enable display of the first virtual expo booth; and providing, to the first client device, one or more multimedia streams associated with a preview of content available within the first virtual expo booth.

A twenty-sixth example employs the method of the twenty-fifth example, wherein the one or more multimedia streams provide a time-limited representation of live content presented within the first virtual expo booth.

A twenty-seventh example employs the method of the twenty-fifth or twenty-sixth examples, wherein the one or more multimedia streams provide a recorded segment of content previously presented within the first virtual expo booth.

A twenty-eighth example employs the method of any of the twenty-fifth through twenty-seventh examples, wherein the selection indicates a selection to preview content presented within the first virtual expo booth, and wherein the one or more multimedia streams provide preview of content presented within the first virtual expo booth, and further including transmitting, to the first client device, an indication that the preview of the content has concluded.

A twenty-ninth example employs the method of any of the twenty-fifth through twenty-eighth examples, and also includes, after receiving the selection of the first virtual expo booth providing, to the first client device, information to enable display of a graphical representation of a plurality of virtual presentations available within the first virtual expo booth; receiving, from the first client device, a selection of a first virtual presentation; and wherein the one or more multimedia streams are further associated with the first virtual presentation.

A thirtieth example employs the method of any of the twenty-fifth through twenty-ninth examples, and also includes, after receiving the selection of the first virtual expo booth providing, to the first client device, information to enable display of a graphical representation of a plurality of virtual presentations available within the first virtual expo booth; providing, to the first client device, information to enable display of a graphical representation of a virtual informational display; receiving, from the first client device, a selection of the virtual informational display; providing, to the first client device, information to enable display of a graphical representation of one or more informational resources; receiving, from the first client device, a selection of a first information resource of the one or more informational resources; and providing, to the first client device, a copy of the first information resources.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
    joining a virtual expo hosted by a video conference provider, the virtual expo including a plurality of virtual expo booths;
    presenting a graphical representation of the virtual expo and one or more virtual expo booths of the plurality of virtual expo booths;
    receiving an input indicating a selection to preview live multimedia content presented within a first virtual expo booth of the plurality of virtual expo booths without joining the first virtual expo booth;
    receiving, from the video conference provider, one or more multimedia streams associated with the first virtual expo booth without joining the first virtual expo booth; and
    presenting the one or more multimedia streams.

2. The method of claim 1, wherein the one or more multimedia streams provide a time-limited representation of live content presented within the first virtual expo booth.

3. The method of claim 1, wherein the one or more multimedia streams provide a recorded segment of content previously presented within the first virtual expo booth.

4. The method of claim 1, wherein the one or more multimedia streams provide preview of the multimedia content presented within the first virtual expo booth, and further comprising:
    providing an indication that the preview of the multimedia content has concluded; and
    providing an indication requesting whether to enter the first virtual expo booth.

5. The method of claim 1, further comprising:
    receiving an input to join the first virtual expo booth.

6. A system comprising:
    a communications interface;
    a non-transitory computer-readable medium; and
    one or more processors communicatively coupled to the communications interface and the non-transitory computer-readable medium, the one or more processors configured to execute processor-executable instructions stored in the non-transitory computer-readable medium to:
        join a virtual expo hosted by a video conference provider, the virtual expo including a plurality of virtual expo booths;
        present a graphical representation of the virtual expo and one or more virtual expo booths of the plurality of virtual expo booths;
        receive an input indicating a selection to preview live multimedia content presented within a first virtual expo booth of the plurality of virtual expo booths without joining the first virtual expo booth;
        receive, from the video conference provider, one or more multimedia streams associated with the first virtual expo booth without joining the first virtual expo booth; and
        present the one or more multimedia streams.

7. The system of claim 6, wherein the one or more multimedia streams provide a time-limited representation of live content presented within the first virtual expo booth.

8. The system of claim 6, wherein the one or more multimedia streams provide a recorded segment of content previously presented within the first virtual expo booth.

9. The system of claim 6, wherein the one or more processors are configured to execute further processor-executable instructions stored in the non-transitory computer-readable medium to:
    receive an input to join the first virtual expo booth.

10. The system of claim 6, wherein the one or more processors are configured to execute further processor-executable instructions stored in the non-transitory computer-readable medium to, after receipt of the input indicating the first virtual expo booth:
    present a graphical representation of a plurality of virtual presentations available within the first virtual expo booth;
    receive a selection of a first virtual presentation; and
    wherein the one or more multimedia streams are further associated with the first virtual presentation.

11. The system of claim 6, wherein the one or more processors are configured to execute further processor-executable instructions stored in the non-transitory computer-readable medium to, after receipt of the input indicating the first virtual expo booth:
    present a graphical representation of a plurality of virtual presentations available within the first virtual expo booth;
    present a graphical representation of a virtual informational display;
    receive a selection of the virtual informational display;
    present one or more informational resources;
    receive a selection of a first information resource of the one or more informational resources; and
    obtain a copy of the first information resources.

12. A non-transitory computer-readable medium comprising processor-executable instructions configured to cause one or more processors to:
    join a virtual expo hosted by a video conference provider, the virtual expo including a plurality of virtual expo booths;
    present a graphical representation of the virtual expo and one or more virtual expo booths of the plurality of virtual expo booths;
    receive an input indicating a selection to preview live multimedia content presented within a first virtual expo booth of the plurality of virtual expo booths without joining the first virtual expo booth;

receive, from the video conference provider, one or more multimedia streams associated with the first virtual expo booth without joining the first virtual expo booth; and present the one or more multimedia streams.

13. The non-transitory computer-readable medium of claim 12, wherein the one or more multimedia streams provide a time-limited representation of live content presented within the first virtual expo booth.

14. The non-transitory computer-readable medium of claim 12, wherein the one or more multimedia streams provide a recorded segment of content previously presented within the first virtual expo booth.

15. The non-transitory computer-readable medium of claim 12, further comprising processor-executable instructions configured to cause the one or more processors to:

receive an input to join the first virtual expo booth.

16. The non-transitory computer-readable medium of claim 12, further comprising processor-executable instructions configured to cause the one or more processors to, after receipt of the input indicating the first virtual expo booth:

present a graphical representation of a plurality of virtual presentations available within the first virtual expo booth;

receive a selection of a first virtual presentation; and wherein the one or more multimedia streams are further associated with the first virtual presentation.

17. The non-transitory computer-readable medium of claim 12, further comprising processor-executable instructions configured to cause the one or more processors to, after receipt of the input indicating the first virtual expo booth:

present a graphical representation of a plurality of virtual presentations available within the first virtual expo booth;

present a graphical representation of a virtual informational display;

receive a selection of the virtual informational display;

present one or more informational resources;

receive a selection of a first information resource of the one or more informational resources; and obtain a copy of the first information resources.

* * * * *